May 5, 1931. F. H. OWENS 1,803,404
MOTION PICTURE FILM PRINTING APPARATUS
Filed Oct. 2, 1926
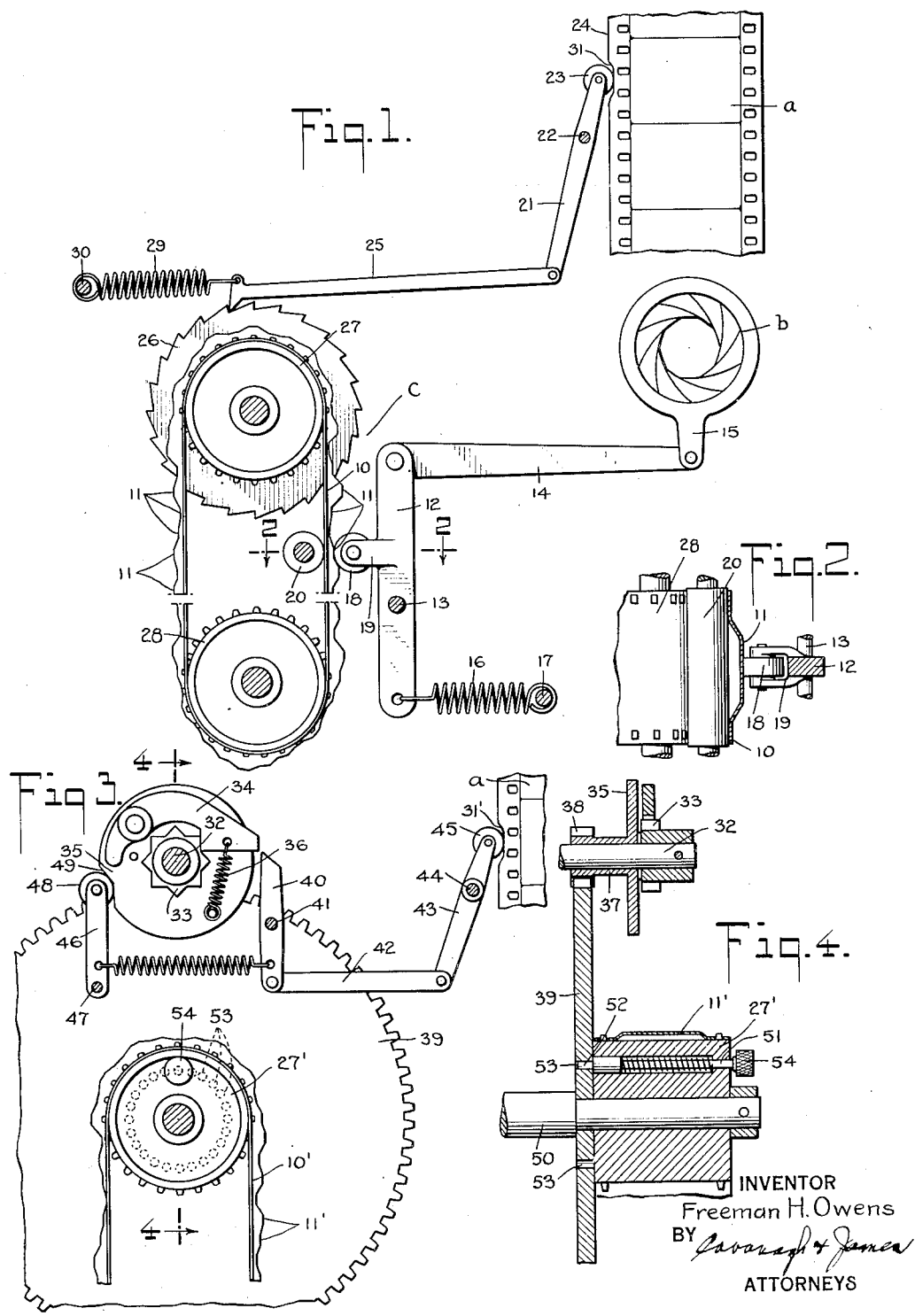
INVENTOR
Freeman H. Owens
BY
ATTORNEYS Patented May 5, 1931

1,803,404

UNITED STATES PATENT OFFICE

FREEMAN H. OWENS, OF NEW YORK, N. Y.

MOTION-PICTURE-FILM-PRINTING APPARATUS

Application filed October 2, 1926. Serial No. 139,075.

This invention relates to motion picture film printing apparatus; and has special reference to the provision of a motion picture film printing apparatus embodying means for automatically changing the printing light intensities in predetermined manners.

As is well known, motion picture positive film is printed from the negative film either by the contact method, in which the negative and positive films are moved one in contact with the other past a light source, or by the optical projection method, in which the image on the negative is projected by optical means onto the positive, both being moved either continuously or intermittently. In the use of both methods, means such as a shutter device is employed for determining or controlling the intensities of the transmitted or projected light employed for the printing to suit the needs or requirements of service.

In printing motion picture negative film portraying a number of different scenes taken under different lighting conditions, it is the practice to predeterminedly vary the printing light intensity so as to correct for or modify the different light conditions under which the negative is thus taken, such modification being obtained by changing the luminous intensity of the light employed in the printing step. To facilitate the printing of such film in the hands of unskilled help, apparatus has been devised for automatically producing the changes in light intensity in accordance with the intensities selected for different parts or portions of the motion picture film, such changes being effected automatically in the continuous operation of the printer.

Apparatus of various designs have heretofore been suggested for automatically producing the light changes, some such apparatus depending upon the control of the shutter device and others upon the control of the lamp employed in the printing apparatus, the luminous intensity of the lamp being modified electrically by changing the in series resistance of the lamp. Apparatus which employ the method of changing the intensity of the lamp filament have not been found satisfactory in practice, largely because the range of luminosity change of the lamp is comparatively small and because the aging of the lamp modifies the luminousity curve thereof. Apparatus which embody the alternative method of varying the shutter device to determine the light intensity may be operated with greater precision and more definiteness, but apparatus of prior design employing this method, as far as I am aware, have generally been cumbersome or intricate and therefore comparatively difficult to manipulate or operate.

A prime object of my present invention therefore comprehends the provision of an improved apparatus constructed and designed to control the intensity of the transmitted light of the printer by predetermining the operative movements of the shutter device, which apparatus is characterized by simplicity of construction and a capability of efficient operation.

To the accomplishment of the foregoing and such other objects as will hereinafter appear, my invention consists in the elements and their relation one to the other as hereinafter more particularly described and sought to be defined in the claims; reference being had to the accompanying drawings which show preferred embodiments of my invention, and in which:

Fig. 1 is a front elevational view showing parts of the printing machine embodying the principles of my invention, Fig. 2 is a fragmentary part thereof taken in cross-section in the plane of the line 2—2, Fig. 1, Fig. 3 is a view of the parts of the printing machine showing a modified form of my invention, and Fig. 4 is a view thereof taken in cross-section in the plane of the line 4—4, Fig. 3.

Referring now more in detail to the drawings and having reference first to Figs. 1 and 2 thereof, the apparatus for automatically determining the different light intensities to be projected during the printing step is shown associated with a motion picture negative film $a$ and a shutter device $b$, which latter is preferably of the iris diaphragm type, such apparatus comprising a means, 10 generally designated as c, connected to the shutter b for varying the size of the shutter opening thereof and connected so as to be operated by the film a in the movement of the latter, the said means c being operated in accordance with the varying light intensities selected for the printing of the negative onto the positive.

The shutter opening controlling means c comprises a movable strip 10 provided with a series of operating elements 11, 11 thereon; and cooperating with said strip elements there is provided a means connecting the said movable strip 10 with the shutter b, the said means including in the preferred construction a linkage device consisting of a lever 12 fulcrumed as at 13 connected at one end by means of a link 14 to an arm 15 of the iris diaphragm b and connected at the other end to an expansion spring 16 anchored as at 17 to any stationary part of the machine, the construction being such that the spring 16 maintains the parts of the connecting means and shutter in position with a cam roller or follower 18 journalled in arms 19 of the lever 12 in engagement with the elements 11 of the movable strip 10, a presser roller 20 being preferably located on the opposite side of the strip 10 to fix the positions assumed by the parts of the connecting means.

The operating elements 11 on the movable strip 10 preferably comprise cammed or projecting portions, the degree of projection of which determines the operation imparted to the connecting means and therefore determines the degree or amount of shutter opening. In the preferred construction the strip 10 is made of an endless band preferably of sheet metal or the like, from which the cammed or projecting elements 11 are punched by any suitable punching apparatus, the depth of punching corresponding to the amount of shutter opening desired for any given luminous intensity. It will be understood that the endless strip or band 10 is first punched by an operator in accordance with a chart or record of the sequential or successive light intensities desired, which chart or record is determined from the successive portions of the particular negative film which is to be printed. From such a chart or record the continuous or endless strip or band 11 is made, producing a surface configuration such as is diagrammatically shown in Fig. 1 of the drawings, in which the hills and dales are all different heights and depths.

For operating the endless strip to produce the changing light intensities in accordance with the film parts to be printed, there is provided means connecting the said strip 10 with the motion picture film a operative for moving said strip when a change in printing intensity is to be effected. In the form of the invention shown in Figs. 1 and 2, such means simply comprises a lever 21 fulcrumed as at 22 having at one end a film follower or roller 23 movable in cooperative relation with an edge 24 of the film a, the other end of said lever 21 being connected by means of a link pawl 25 with a ratchet 26 to which may be fixed a drum or sprocket 27 over which the endless strip 10 is threaded, a second sprocket 28 being preferably provided for the bottom end of the endless strip 10. The pawl link 25 may be operated in any desired way, and for simplicity of operation the same has been provided with a spring 29 connected at one end to the link pawl 25 and anchored at the other end as at 30, the cooperation of the parts being such that the roller 23 of the lever 21 is always maintained in engagement with the edge 24 of the film a. The film a is provided with notches 31 at points where a light change is to be effected; and when such a notch in the film is reached, the lever 21 is moved so as to actuate the link pawl 25 a distance of one ratchet tooth, and by this means it will be seen that motion is imparted to the endless strip 10 to bring a succeeding operating element thereon in engagement with the roller 18 of the shutter connecting means, the predetermined operation of the shutter being thereby effected.

With this construction, therefore, it will be understood that definite light changes may be obtained by shutter control automatically in the continuous operation of the printer by simple apparatus which may be operated quickly and efficiently, such apparatus being readily employable by unskilled help after the desired sequence of light changes is selected and an endless control strip punched or otherwise made from a chart or record of the selected changes.

Referring now to Figs. 3 and 4 of the drawings, I show a modified form of my invention in which independent motor means are employed for producing the step by step movement of the endless band 10' having the operating elements 11' thereon, such motor means being controlled by the film movement. This means comprises a continuously rotatable shaft 32 having a clutch star wheel 33 fixed thereto, the said clutch wheel being adapted to engage at predetermined times with a spring actuated pawl or dog 34 pivotally mounted on a disk wheel 35 and actuated into the position shown in Fig. 3 of the drawings by means of a spring 36, the said disk wheel 35 being provided with a sleeve portion 37 freely rotatable on the shaft 32 and having a pinion 38 meshing with a gear 39, which gear carries the upper strip moving sprocket 27'.

Still referring to Figs. 3 and 4 of the drawings, the clutch parts 33, 34 cooperate with a linkage control mechanism comprising a lever 40 fulcrumed as at 41 on a stationary part of the frame work, said lever being connected by means of a link 42 to a second lever 43 fulcrumed as at 44, which second lever is provided with the film follower 45. By means of this construction it will be apparent that when the roller 45 moves over the edge of the film a', the lever 40 forms a stop element for the dog 34 and moves the same against the tension of the spring 36 out of engagement with the star wheel 33, permitting free rotation of the shaft 32 and preventing any transmission of this motion to operate the endless strip 10'. When, however, the roller 45 enters a notch 31' of the film a', the stop lever 40 is moved out of its stopping position as shown in Fig. 3 of the drawings and the dog 34 is actuated into engagement with the clutch star wheel 33, permitting a complete revolution of the disk wheel 35 which causes a step actuation of the gear 39 and the endless strip 10'. After the revolution of the clutch parts the stop lever 40 is again moved by the onward motion of the film a' into its stop position, causing the disengagement of the operating parts. Preferably to fix the stop position of the disk wheel 35, I may provide an arm 46 fixed as at 47 to the framework of the machine, which arm has a roller 48 mating with a notch 49 in the disk wheel 35. By means of this construction an independent motor means may be employed for moving the endless strip 10', the film engaging parts being provided merely for controlling the operation of the endless strip 10' rather than providing the motive parts therefor.

It is desirable to provide means for effecting motion of the endless strip 10 or 10' relative to its operating parts so as to permit shifting of the position of the endless strip as when it is desired to change the sequence of film parts to be printed. To this end I provide means for changing the position of the sprocket 27' relatively to the gear 39, such means comprising a shaft 50 on which the sprocket 27' is freely mounted, the said sprocket being provided with a retractible spring-pressed plunger 51 having a rod or pin 52 at its end which may be received by any of a plurality of orifices 53 provided in the gear wheel 39. Manifestly the plunger arm 51 may be retracted by grasping the knurled head 54 thereof and the sprocket wheel may be moved relatively to the gear wheel to position the endless strip as desired.

The use and operation of the motion picture film printing apparatus employing the principles of my present invention and the many advantages thereof will in the main be fully apparent from the above detailed description thereof. It will be further apparent that while I have shown my invention in its preferred forms, that many changes and modifications may be made in the structure disclosed without departing from the spirit of the invention, defined in the following claims.

I claim:

1. In a motion picture film printing apparatus, the combination with a shutter and a negative motion picture film movable past the shutter opening, of means for predeterminedly varying the shutter opening in accordance with varying light intensities selected for the printing of the negative, said means comprising a movable strip independent of the film and provided with a series of operating elements, means connected to the shutter and mechanically operated by said operating elements of the strip, the character of the elements on the strip determining the operation imparted thereby to the connecting means and consequently the amount of shutter opening, and means operated by the motion picture film when a change in printing intensity is to be effected for moving said strip to change the cooperative relation between the operating elements on the strip and the said connecting means.

2. In a motion picture apparatus, the combination with a shutter and a motion picture film movable past the shutter opening, of means for predeterminedly varying the shutter opening in accordance with varying light intensities selected for the film, said means comprising a movable strip independent of the film and provided with a series of operating elements, means connected to the shutter and mechanically operated by said operating elements of the strip, the character of the elements on the strip determining the operation imparted thereby to the connecting means and consequently the amount of shutter opening, and means operated by the motion picture film when a change in light intensity is to be effected for moving said strip to change the cooperative relation between the operating elements on the strip and the said connecting means.

3. In a motion picture apparatus, the combination with a shutter and a motion picture film movable past the shutter opening, of means for predeterminedly varying the shutter opening in accordance with varying light intensities selected for the film, said means comprising a movable endless band independent of the film and provided with a series of operating elements, means connected to the shutter and mechanically operated by said operating elements of the band, the elements on the band determining the operation imparted thereby to the connecting means and consequently the amount of shutter opening, and means operated by the motion picture film when a change in light intensity is to be effected for moving said band to change the cooperative relation between the operating elements on the band and the said connecting means.

4. In a motion picture film printing apparatus, the combination with a shutter and a negative motion picture film movable past the shutter opening, of means for predeterminedly varying the shutter opening in accordance with varying light intensities selected for the printing of the negative, said means comprising a movable strip provided with a series of cam or projecting portions defining operating elements, means connected to the shutter and operated by said operating elements of the strip, the degree of projection of the elements on the strip determining the operation imparted to the connecting means and the amount of shutter opening, and means operated by the motion picture film when a change in printing intensity is to be effected for moving said strip to change the cooperative relation between the said projecting operating elements on the strip and the said connecting means.

5. In a motion picture film printing apparatus, the combination with an iris diaphragm shutter and a negative motion picture film movable past the shutter opening, of means for predeterminedly varying the shutter opening in accordance with varying light intensities selected for the printing of the negative, said means comprising a movable endless strip provided with a series of cam or projecting portions defining operating elements, means connected to the shutter and operated by movement over said operating elements of the strip, the degree of camming of the elements on the strip determining the degree of operation imparted to the connecting means and the amount of shutter opening, and means operated by notches in the motion picture film when a change in printing intensity is to be effected for moving said strip to change the cooperative relation between the operating elements on the strip and the said connecting means.

6. In a motion picture film apparatus, the combination with a shutter and a motion picture film movable past the shutter opening in accordance with varying light intensities selected for the film, said means comprising a movable strip provided with a series of operating elements, linkage means connected to the shutter and having a roller moving in engagement with the said operating elements, the elements on the strip determining the operation imparted to the connecting means and the amount of shutter opening, and means operated by the motion picture film when a change in light intensity is to be effected for moving said strip step by step to change the cooperative relation between the operating elements on the strip and the said connecting means.

7. In a motion picture film printing apparatus, the combination with a shutter and a motion picture film movable past the shutter opening in accordance with varying light intensities selected for the printing film, said means comprising a movable strip provided with a series of cam or projecting portions defining operating elements, linkage means connected to the shutter and having a roller moving in engagement with the said operating elements, the degree of projection of the elements on the strip determining the operation imparted to the connecting means and the amount of shutter opening, and linkage means operated by the motion picture film when a change in light intensity is to be effected for moving said strip step by step to change the cooperative relation between the operating elements on the strip and the said connecting means.

8. In a motion picture film apparatus, the combination with a shutter and a motion picture film movable past the shutter opening in accordance with varying light intensities selected for the film, said means comprising a movable strip independent of the film and provided with a series of operating elements, means connected to the shutter and mechanically operated by said operating elements, the elements on the strip determining the operation imparted thereby to the connecting means and consequently the amount of shutter opening, means operated by the motion picture film when a change in light intensity is to be effected for progressively moving said strip step by step to change the cooperative relation between the operating elements on the strip and the said connecting means, and means for moving said strip relatively to the film operated means.

9. In a motion picture film apparatus, the combination with a shutter and a motion picture film movable past the shutter opening in accordance with varying light intensities selected for the film, said means comprising a sprocket and a movable endless strip thereon provided with a series of cammed operating elements, linkage means connected to the shutter and having a roller moving in engagement with the said cammed operating elements, the elements on the strip determining the operation imparted to the connecting means and the amount of shutter opening, linkage means operated by notches in the motion picture film when a change in light intensity is to be effected for moving said strip step by step to change the cooperative relation between the operating elements on the strip and the said connecting means, and means for shifting the position of said sprocket relatively to the film operated linkage means.

Signed at New York city in the county of New York and State of New York this 30th day of September, A. D. 1926.

FREEMAN H. OWENS.